United States Patent
Kaiya et al.

(10) Patent No.: US 6,732,245 B2
(45) Date of Patent: May 4, 2004

(54) COPYING METHOD BETWEEN LOGICAL DISKS, DISK-STORAGE SYSTEM AND ITS STORAGE MEDIUM

(75) Inventors: Norikazu Kaiya, Nagoya (JP); Yasuhiro Onda, Nagoya (JP); Tadaomi Kato, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/259,506

(22) Filed: Sep. 30, 2002

(65) Prior Publication Data

US 2003/0028737 A1 Feb. 6, 2003

Related U.S. Application Data

(62) Division of application No. 09/534,113, filed on Mar. 23, 2000.

(30) Foreign Application Priority Data

Sep. 30, 1999 (JP) .......................................... 11-279678

(51) Int. Cl.[7] .............................................. G06F 12/00
(52) U.S. Cl. ....................... 711/162; 711/111; 711/112; 711/113; 711/161
(58) Field of Search .............................. 711/114, 162, 711/112, 161

(56) References Cited

U.S. PATENT DOCUMENTS

| | | | | |
|---|---|---|---|---|
| 5,155,845 A | * | 10/1992 | Beal et al. ........................ | 714/6 |
| 5,410,667 A | * | 4/1995 | Belsan et al. ................. | 711/114 |
| 5,724,501 A | * | 3/1998 | Dewey et al. ................... | 714/9 |
| 5,761,704 A | | 6/1998 | Sasaki .......................... | 711/111 |
| 5,799,147 A | | 8/1998 | Shannon ......................... | 714/6 |
| 5,835,954 A | * | 11/1998 | Duyanovich et al. ........ | 711/162 |
| 6,058,054 A | * | 5/2000 | Islam et al. .................. | 365/200 |
| 6,145,066 A | | 11/2000 | Atkin ........................... | 711/165 |
| 6,269,431 B1 | | 7/2001 | Dunham ....................... | 711/162 |
| 6,363,385 B1 | * | 3/2002 | Kedem et al. .................. | 707/10 |
| 6,408,370 B2 | * | 6/2002 | Yamamoto et al. .......... | 711/167 |
| 6,564,307 B1 | * | 5/2003 | Micka et al. ................. | 711/156 |

FOREIGN PATENT DOCUMENTS

| | | | |
|---|---|---|---|
| GB | 1065585 A2 | | 1/2001 |
| JP | 359075349 | * | 4/1984 |
| JP | 410312646 | * | 11/1998 |
| WO | WO 97/24668 | | 7/1997 |

OTHER PUBLICATIONS

Abstract of JP 5–158625.

* cited by examiner

*Primary Examiner*—Hiep T. Nguyen
*Assistant Examiner*—Ngoc V Dinh
(74) *Attorney, Agent, or Firm*—Staas & Halsey LLP

(57) ABSTRACT

A copying method, disk storage system, and storage medium for copying data from one logical disk to another logical disk, making possible immediate access, in response to a copy command. Copying from a first logical disk to a second logical disk is performed for each area in a copy range, and where is an access to either logical disk, copying is interrupted. When performing update access of an uncopied area in the first logical disk, the area is copied from the first logical disk to a second logical disk, and then the uncopied area is updated. When performing reference access of an uncopied area in the second logical disk, the corresponding area in the first logical disk is referenced. When performing update access of an uncopied area in the second logical disk, that area in the second logical disk is updated, and copying is prohibited. In this way, it is possible to access the first and second logical disks while copying is in progress, and it is possible to immediately notify a host, upon receipt of a copy instruction, that a copying has been completed.

4 Claims, 16 Drawing Sheets

FIG. 6

| Access pattern | Access logical disk | Actual copy | I/O access |
|---|---|---|---|
| Pattern 1 | Source | Complete | Ref |
| Pattern 2 | | | Update |
| Pattern 3 | | Uncomplete | Ref |
| Pattern 4 | | | Update |
| Pattern 5 | Destination | Complete | Ref |
| Pattern 6 | | | Update |
| Pattern 7 | | Uncomplete | Ref |
| Pattern 8 | | | Update |

Prior art

COPYING METHOD BETWEEN LOGICAL DISKS, DISK-STORAGE SYSTEM AND ITS STORAGE MEDIUM

This is a divisional of application Ser. No. 09/534,113, filed Mar. 23, 2000.

BACKGROUND OF THE INVENTION

1. Field of the Invention

This invention relates to a copying method between logical disks, disk storage system and storage medium for copying between logical disks, and in more particular to a copying method, disk-storage system and storage medium that makes immediate access of a logical disk in response to a copy command possible.

2. Prior Art

A logical disk is a disk that appears to be unrelated to physical restrictions imposed by a physical disk. A logical disk can be constructed from a plurality of physical disk devices, or from one physical disk with a plurality of logical disks. The kind of disk used is determined by the parameters of capacity and performance.

This typical system is called RAID (for example 0, 1, 0+1, 3, 5) rank or RAID group.

Copying between logical disks is used as a backup for saving data as well as other uses. For example, executing a test while continuing work. In this case, the logical disk that is used for work is copied and the copy-destination logical disk is used by the test system. By doing this, the work being performed using the copy-source logical disk is not affected even if data are damaged by the test system that uses the copy-destination logical disk.

Also, a logical disk can be used in online work by copying the logical disk used in online work and using the copy-destination logical disk in batch processing. By doing this, the performance of the online work that uses the copy-source logical disk is not affected by the batch processing.

Many cases such as these which require copying between logical disks are increasing. However, work must be stopped while copying the logical disk. For example, it can take one hour to copy 9 Gbytes. In 24-hour continuous operating conditions of recent years, it is desirable to make the work stop time as close to zero as possible by making the copy time as close to zero as possible.

FIG. 13 to FIG. 16 are drawings explaining the prior art. FIG. 13 and FIG. 14 explain the prior separate dual volume system, FIG. 15 explains the prior log structured file system, and FIG. 16 explains the prior concurrent copy system.

The following methods are known as methods for copying logical-disk data in a prior RAID device.

(1) Separate Dual Volume System

In a system comprising a host 90 and RAID device 91 as shown in FIG. 13, first a copy instruction is sent from the host 91, as sown in FIG. 14, and the copy-source volume (logical disk) 93 is prepared (defined). Next, in response to an "Establish Pair" instruction, copying begins from a primary (copy-source logical disk) 93 to a secondary (copy-destination logical disk) 94 (create a dual state). Establishment of a pair is completed after copying is finished (after the dual state is created). Establishment this dual state is created, an update process request from the host 90 is reflected by primary (copy-source logical disk) 93 and secondary (copy-destination logical disk) 94. By issuing an instruction to separate the dual pairs, copying of the logical volume at the state is complete. Now, as shown in FIG. 13, it is possible for different hosts (applications) 90, 95 to use the primary (copy-source logical disk) 93 and secondary (copy-destination logical disk) 94.

As shown in FIG. 14, the primary (copy-source logical disk) 93 can be accessed during copying, however, the secondary (copy-destination logical disk) cannot be accessed during copying.

(2) Log Structured File System

As shown in FIG. 15, logical disks A, B, C have been defined by the host. Each data block is stored in one physical disk 96. Each of the logical disks is defined by a data pointer of the physical disk 96. Copying from a logical disk A to a logical disk B, is performed by setting the pointer of the logical disk B as pointer of the logical disk A.

Moreover, the update data B2 for the logical disk B are stored in the physical disk separately from the original data. Also, by updating the pointer of the logical disk B to the pointer of the update data B2, it is possible to update the logical disk B without changing the original data A1 to A6 of the logical disk A.

This method is not followed by copying of actual data, and by setting pointers, the copy operation can completed immediately.

(3) Concurrent Copy System

As shown in FIG. 16, when copying from the copy-source disk 93 to the copy-destination disk 94, the host 90 reads the data to be copied from the copy-source disk (A), and with a data transfer function, writes the data to the copy-destination disk 94. The bitmap of the copied address is set as copied.

When there is an update request for an uncopied area of the copy-source disk 93 during copying, that data of the copy-source disk 93 is stored away in a side file 92 as shown a mark (1). That address portion of the bitmap is set as being stored away in a side file as shown a mark (2). The copy-source disk 93 is also updated as shown a mark (3). When copying data that have been stored away in the side file 92, the data to be copied are read from the side file 92 and, with the data transfer function, are written to the copy-destination disk 94 as shown a mark (4). This method makes it possible for the host to reference and update the copy-source disk 93 during copying.

The prior art, however, had the following problems.

(1) In the separate dual volume system shown in FIG. 13 and FIG. 14, it is not possible to access the copy-source disk during copying. Therefore, to access the copy-source disk it is necessary to wait until copying is finished. For example, copying 9 Gbytes takes about 1 hour, so it is necessary to wait 1 hour. Therefore operation must be performed on a schedule.

(2) In the log structured system shown in FIG. 15, it is possible to access both the copy-source logical disk and copy-destination logical disk with a copy instruction, however, since actual data are not copied, the advantages of a dual system where data are copied on separate disks cannot be realized. In other words, damage to the copy-source logical disk is also damage to the copy-destination logical disk, so when the copy-destination physical disk is damaged, it is also not possible to use the copy-source logical disk. Moreover, accessing the copy-destination physical disk, also means accessing the copy-source physical disk, so it is not possible to obtain high-speed performance from using separate disks.

(3) In the concurrent copy system shown in FIG. 16, access of the copy-source logical disk is also possible during copying, however, in order to access the copy-destination logical disk, it is necessary to wait unit copying is finished.

SUMMARY OF THE INVENTION

The objective of this invention is to provide a logical-disk copying method, disk-storage system and storage medium that can be accessed immediately in the copy complete state according to a copy instruction even though copying real data.

Another objective of this invention is to provide a logical-disk copying method, disk-storage system and storage medium for making it possible to access a copy-destination logical disk even during copying.

A further objective of this invention is to provide a logical-disk copying method, disk-storage system and storage medium for determining whether or not the access area has been copied and for making it possible to access the copy-destination logical disk.

This invention is a method for copying data from a copy-source logical disk to a copy-destination logical disk according to a copy instruction. This copying method comprises a step of copying data, in units of each area divided the copy-source logical disk, from the copy-source logical disk to the copy-destination logical disk, a step of interrupting the copy process when receive an access request for the copy-source logical disk or the copy-destination logical disk during copying, and a step of processing said access request.

This access processing step comprises a step of updating the target access area of the copy-source logical disk after the target access area has been copied to the copy-destination logical disk when said request is a request for updating uncopied area of the copy-source logical disk, a step of reading the target access area of the copy-source logical disk when said request is a request for referring uncopied area of the copy-destination logical disk, and a step of updating the target access area of the copy-destination logical disk and prohibiting copying of the target access area when said request is a request for updating of uncopied area of the copy-destination logical disk.

In this invention, system returns immediately a copy complete reply according to a copy instruction, and receives an access request and performs reference and update access of the copy-source or copy-destination logical disk while copying actual data. In order to do this, the copy-source logical disk is divided into a plurality of areas and copied to the copy-destination logical disk in units of the area divisions. When there is an access request during copying, it interrupts the copy operation and executes the access request.

Second, access process is changed depending on whether the target access area is a copied area or uncopied area. In other words, when performing reference or update access of a copied area, since copying is finished, access is allowed. On the other hand, when accessing an uncopied area, the data when the copy instruction are saved and then access is allowed. In other words, when performing reference access of an uncopied area of the copy-source logical disk, since there is no change in data, access is allowed as is. When performing update access of an uncopied area of the copy-source logical disk, the uncopied data before the update would be lost if update is performed as is, so the target access area of the copy-source logical disk is copied to the copy-destination logical disk, thereby the data before the update are moved to the copy-destination logical disk. Then, the target access area of the copy-source logical disk is updated. In this way, it is possible to copy data before an update when there is a copy instruction.

Furthermore, when performing reference access of an uncopied are of the copy-destination logical disk, the data of that area of the copy-source logical disk are read since copying is not yet finished. By doing this, it is possible to reference the copy data of that area even when the area is an uncopied area of the copy-destination logical disk, and it becomes possible to reference data when there is a copy instruction even for the copy-destination logical disk.

When performing update access of an uncopied area of the copy-destination logical disk, the copy-destination logical disk is updated with update data. Also, copying of that are is prohibited. In this way, it is possible to prevent update data of that area of the copy-destination logical disk from being changed by copying.

In another feature of this invention, the access step further comprises a step of referencing the target access area of the copy-source logical disk when performing reference access of the copy-source logical disk, and a step of referencing or updating the target access area of the copy-destination logical disk when accessing copied area of the copy-destination logical disk.

In another feature of this invention, the step of referencing an uncopied area comprises a step of copying the target access area of the referenced copy-source logical disk to the copy-destination logical disk after the target access area of the copy-source logical disk has been referenced. By doing this, it becomes possible to copy together with referencing.

In another feature of this invention, the copying step comprises a step of referencing control information that indicates the copying conditions of the areas, and setting the next copy area, and a step of updating the control information of the copy area after copying of the copy area has finished. Also, the access step comprises a step of referencing the control information and determining whether the target access area is a copied area or uncopied area.

Since there is control information, it is possible to prevent an area from being copied again even if the data of the target access area are copied first. Moreover, since the control information is used to determine whether or not the target access area is a copied area or uncopied area, it is possible to accurately determine whether the access area is a copied area or uncopied area.

In another feature of the invention, the access step further comprises a step of updating the control information of the target access area after the target access area of the copy-source logical disk has been copied to the copy-destination logical disk.

In this way, it is possible for the control information to accurately indicate the copying condition through access processing even if copying is performed in advance.

In another feature of the invention, the copying step comprises a step of referencing the control information that indicates the copying condition of each of the areas of the copy-source logical disk and setting the next copy area, a step of reading the target area of the copy-source logical disk in memory, a step of updating the control information after the target area has been read, and a step of writing the target area of the memory to the copy-destination logical disk.

By reading the target area in memory, it becomes possible to access the copy-source logical disk by updating the control information.

In another feature of the invention, the copying step comprises a step of referencing a bitmap indicated by a flag that indicates the copying condition of each area and setting the next copy area, and a step of updating the copy area flag of the bitmap.

Since the control information is expressed as a bitmap, it is possible to reduce the amount of memory occupied by the control information.

In another feature of the invention, the copying step further comprises a step of notifying in when copying is finished according to the copy instruction. By doing this, it is possible to immediately know when the access source can be accessed.

The disk storage system of this invention comprises one logical disk that is constructed with one physical disk, another logical disk that is constructed with another physical disk, and a disk control circuit for accessing the data of a specified logical disk according to an access instruction, and copying the data in units of area divisions of the copy-source logical disk to the copy-destination logical disk according to a copy instruction.

When performing update access of an uncopied area of the copy-source logical disk, this disk control circuit updates the target access area of the copy-source logical disk after it has been copied to the copy-destination logical disk. When performing reference access of the an uncopied area of the copy-destination logical disk, the disk control circuit reads the target access area of the copy-source logical disk. When performing update access of an uncopied area of the copy-destination logical disk, the disk control circuit updates the target access area of the copy-destination logical disk, and prohibits copying of the target access area.

As mentioned above, by doing this, it becomes possible to access the copy-source and copy-destination disks, and in accordance to a copy instruction, the host is able to immediately access the copy-destination and copy-source logical disks. In addition, it is possible to avoid the copy-wait state.

Another feature of the disk-storage system of the invention has a memory for storing the control information that indicates the copying condition of the area of the copy-source logical disk, and the control circuit references the control information stored in this memory and determines whether the target access area is a copied area or an uncopied area.

The storage medium of the invention contains information to be copied, in units of area divisions of the copy-source logical disk, to the copy-destination logical disk, and contains information for interrupting the copying process and performing the access process when accessing the copy-source and copy-destination logical disks during the copying process. For performing update access of an uncopied area of the copy-source logical disk, this information for performing the access process comprises information for updating the target access area of the copy-source logical disk after the target access area of the copy-source logical disk has been copied to the copy-destination logical disk. For performing reference access of an uncopied area of the copy-destination logical disk, this information for performing the access process comprises information for referencing the target access area of the copy-source logical disk. When performing update access of an uncopied area of the copy-destination logical disk, this information for performing the access process comprises information for updating the target access area of the copy-destination logical disk and prohibiting copying of the access area.

BRIEF DESCRIPTION OF THE DRAWINGS

FIG. 6 is a drawing explaining the access pattern during copying.

DESCRIPTION OF THE PREFERRED EMBODIMENTS

Figure 1:
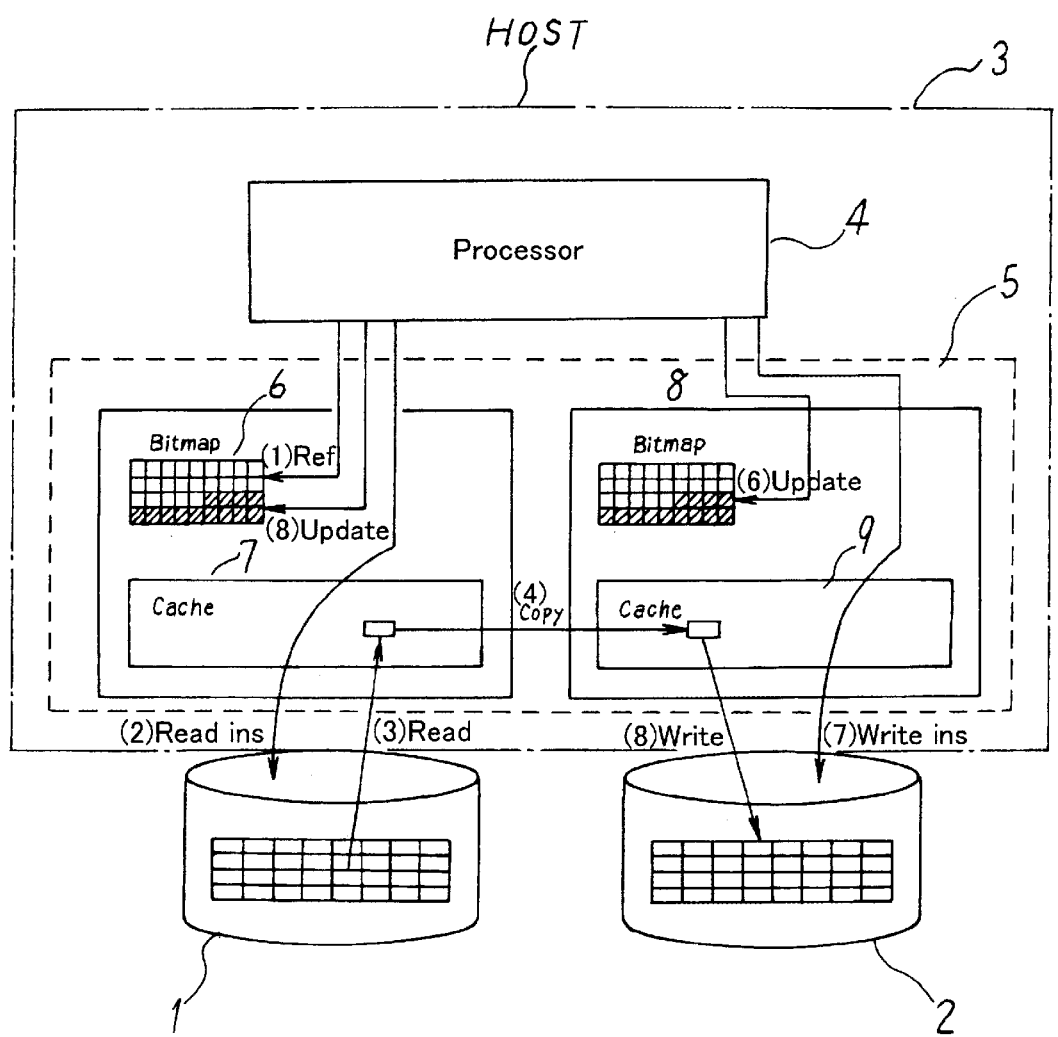
FIG. 1 is a block diagram of the disk control device of one embodiment of this invention.
Figure 2:
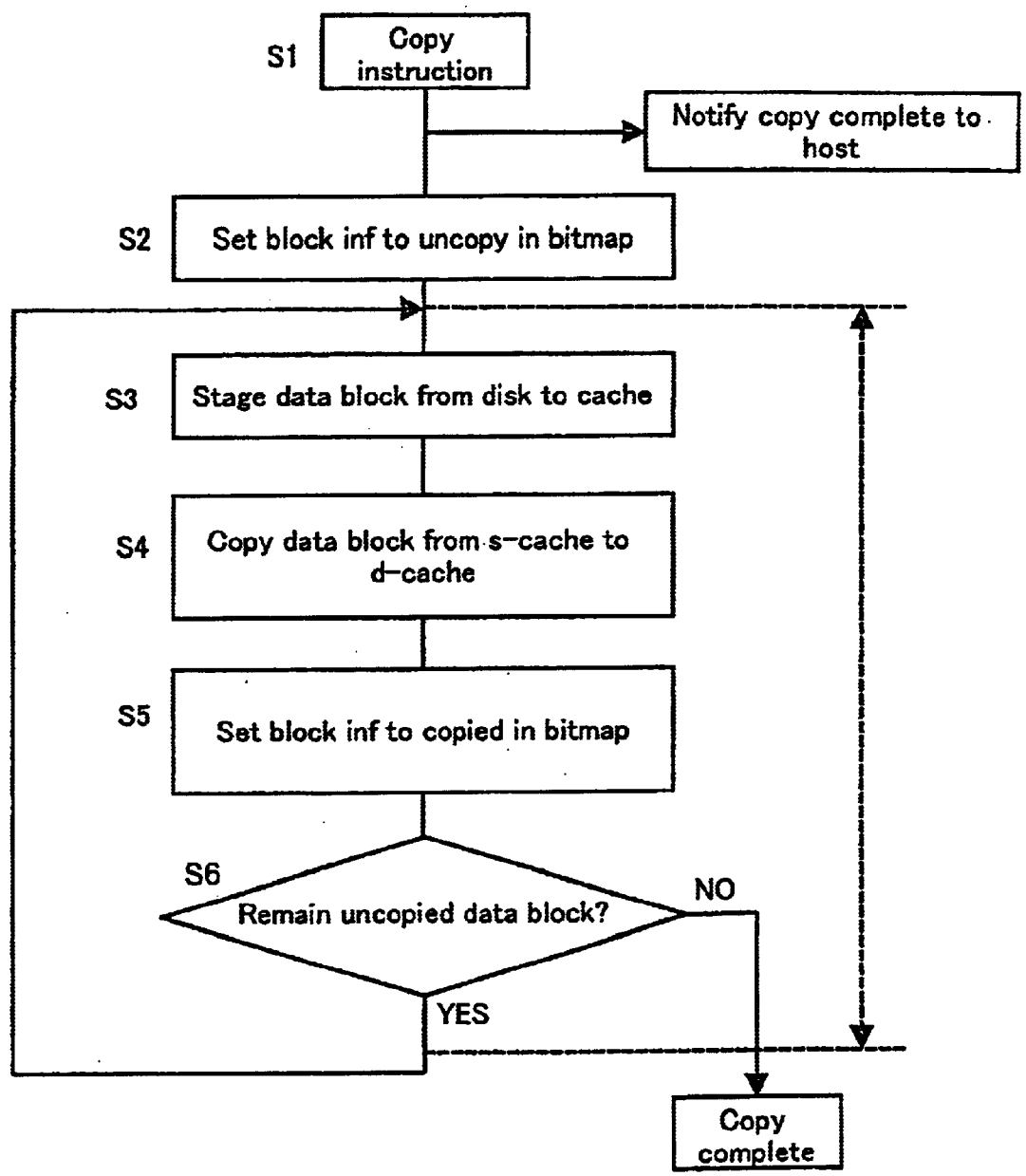
FIG. 2 is a flowchart of the copying process of one embodiment of this invention.

FIG. 1 is a block diagram of the RAID device of one embodiment of this invention, FIG. 2 is a flowchart of the copying process of FIG. 1, and FIG. 3 explains the bitmap memory of FIG. 1.

As shown in FIG. 1, the logical disk 1 is one or more physical disks. A magnetic disk or optical disk can be used as the physical disk. The logical disk 2 is one or more physical disks. The disk controller 3 accesses the logical disks 1 and 2 according to instructions from the host.

The disk controller 3 comprises a processor (CPU) 4 and memory (main storage memory) 5. The memory 5 has a cache area (called cache memory) 7 for the logical disk 1, and a cache area (called cache memory) 9 for the logical disk 2. Also, the memory 5 has a bitmap area (called bitmap) 6 for controlling the copy status of the logical disk 1, and a bitmap area (called bitmap) 8 for controlling the copy status of the logical disk 2.

In other words, as shown in FIG. 3, the bitmaps 6, 8 assign one bit to each data block in the copy range of the logical disks 1, 2, and control the copy status of the data blocks by assigning "1" to uncopied blocks and assigning "0" to copied blocks. A copy program is used as the firmware of the processor 4. In addition, it uses the bitmaps 6, 8 to copy the copy range of the logical disks in units of data blocks.

The copying process will be explained with reference to the flowchart of the copying process shown in FIG. 2. Here, the logical disk 1 is the copy source, and the logical disk 2 is the copy destination.

(S1) At the start of copying, the host gives a copy instruction to the disk controller 3. After the processor 4 receives the copy instruction, it notifies the host that copying is complete. This makes it possible for the host to access the logical disks 1, 2.

Figure 3A:
FIG. 3A to FIG. 3D are drawings explaining the bitmap in FIG. 1.
Figure 3B:

(S2) The processor 4 sets the update information of the copy-destination bitmap 8 to not-updated. As shown in FIG. 3B, each bit of the bitmaps is set to "1", indicating it is uncopied.

(S3) The processor 4 references the copy-source bitmap 6 and acquires the uncopied-block information (1). In addition, the processor 4 instructs that the target blocks in the copy-source logical disk 1 be read (2). By doing this, the target data blocks of the copy-source logical disk 1 are stored in the copy-source cache memory 7. This is called "Staging" (3).

(S4) The processor 4 copies the uncopied data blocks, that were read from the copy-source cache memory 7, to the copy-destination cache memory 9.

Figure 3C:
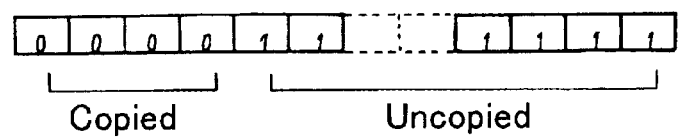

(S5) The processor 4 sets the update block information of the copy-source bitmap 6 and the copy-destination bitmap 8 to "0", indicating that update was completed. FIG. 3C shows this state. In addition, the processor 4 instructs that the uncopied data blocks that were copied into the cache memory 9 be written to the copy-destination logical disk 2 (7). By doing this, the uncopied data blocks that were copied into the cache memory 9 are written to the logical disk 2. This is called "Write Back" (8).

(S6) The processor 4 references the update block information of the copy-source bitmap 6 and determines whether there are any data blocks remaining that should be copied. When there are data blocks remaining that should be copied, the process returns to step S3. On the other hand, of there are no data blocks remaining that should be copied, then copying ends.

When there is an I/O request interrupt for the copy-source or copy-destination logical disks 1, 2 between steps S3 to S6 (area indicated by the arrows in FIG. 2.2), the copying process is interrupted, and that access process is performed (described later using FIG. 4 to FIG. 12).

Figure 4:
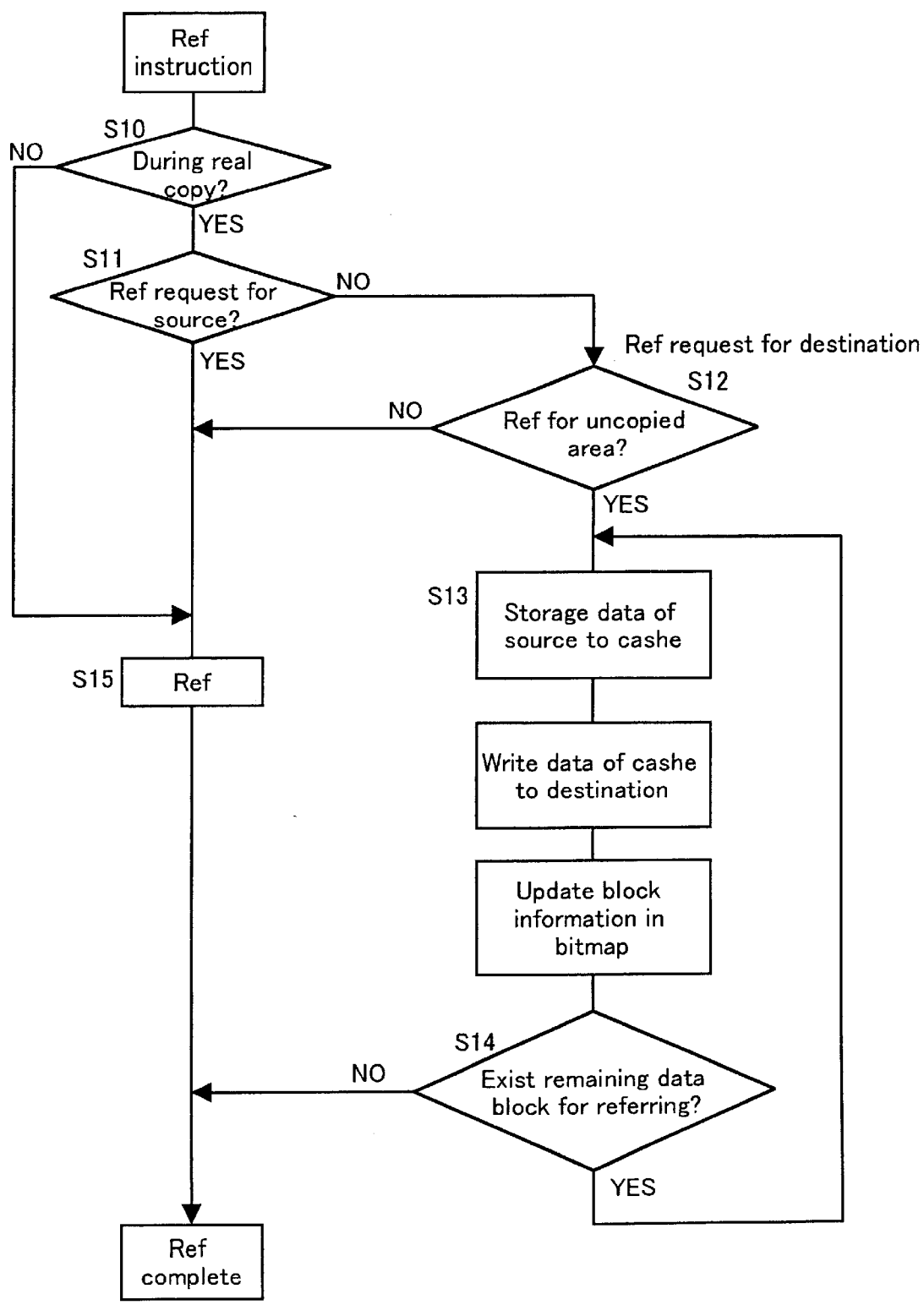
FIG. 4 is a flowchart of the reference process during copying of one embodiment of this invention.
Figure 5:
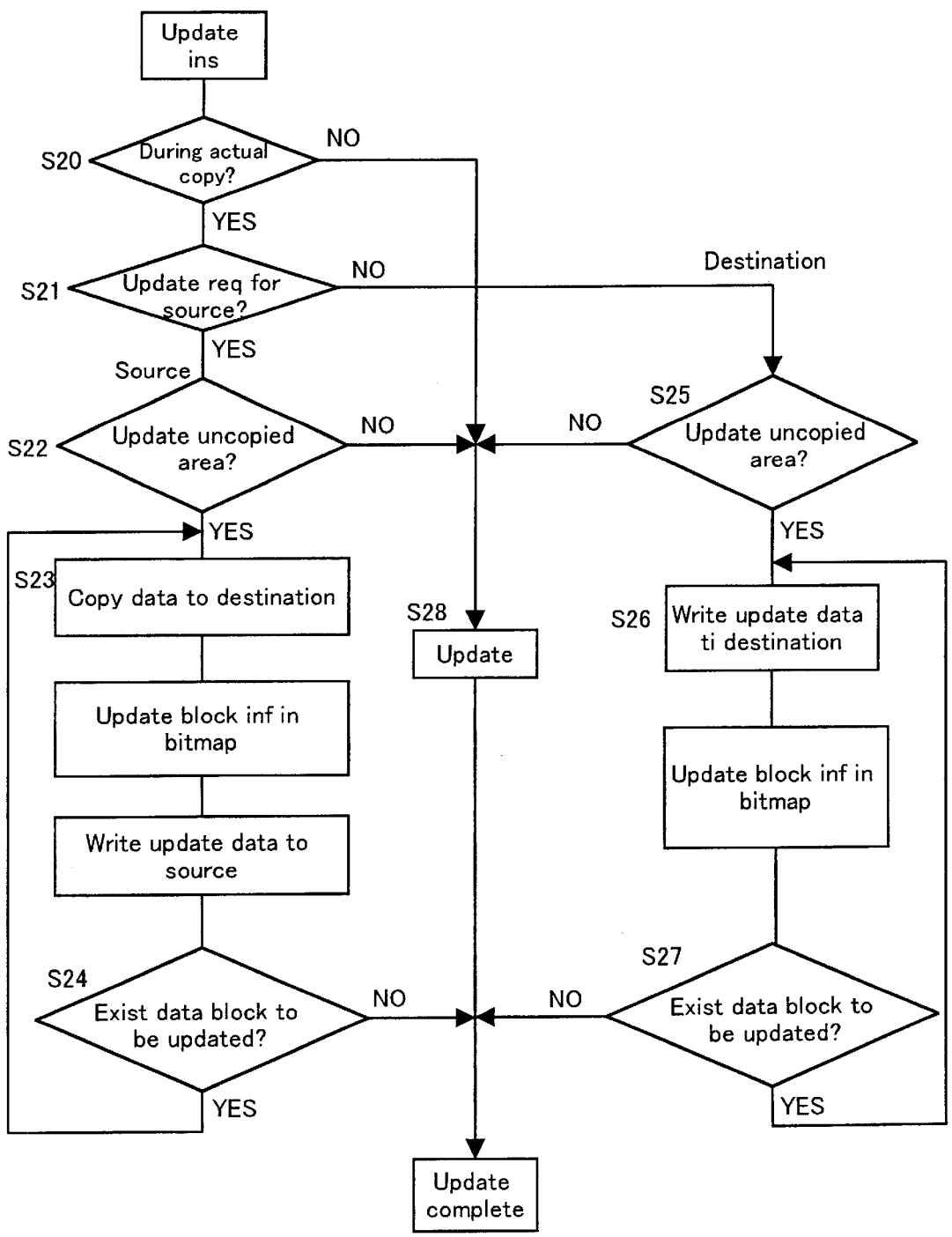
FIG. 5 is a flowchart of the update process during copying of one embodiment of this invention.
Figure 7:
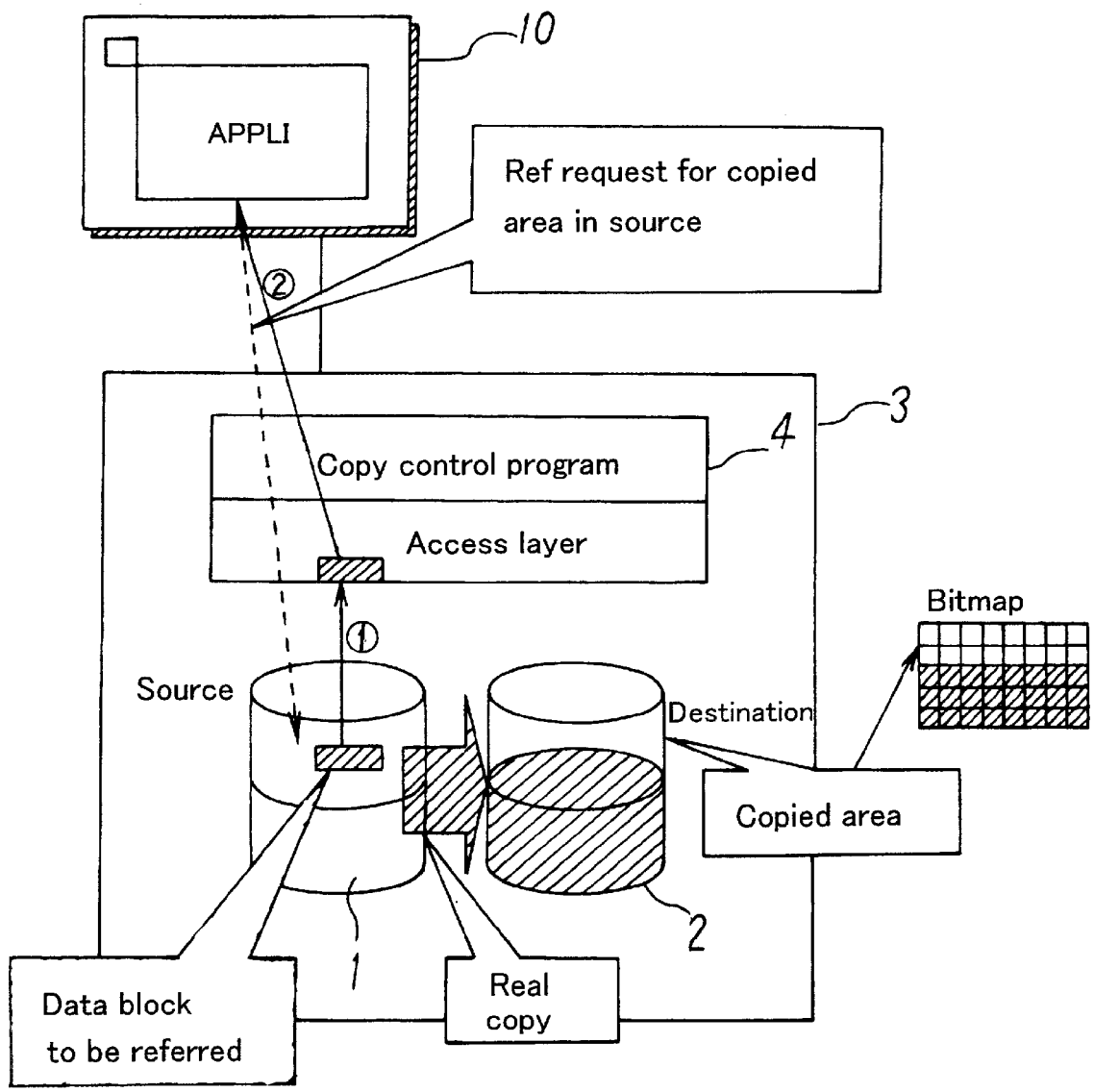
FIG. 7 is a drawing explaining the reference operation of a copied portion of the copy source of one embodiment of this invention.
Figure 8:
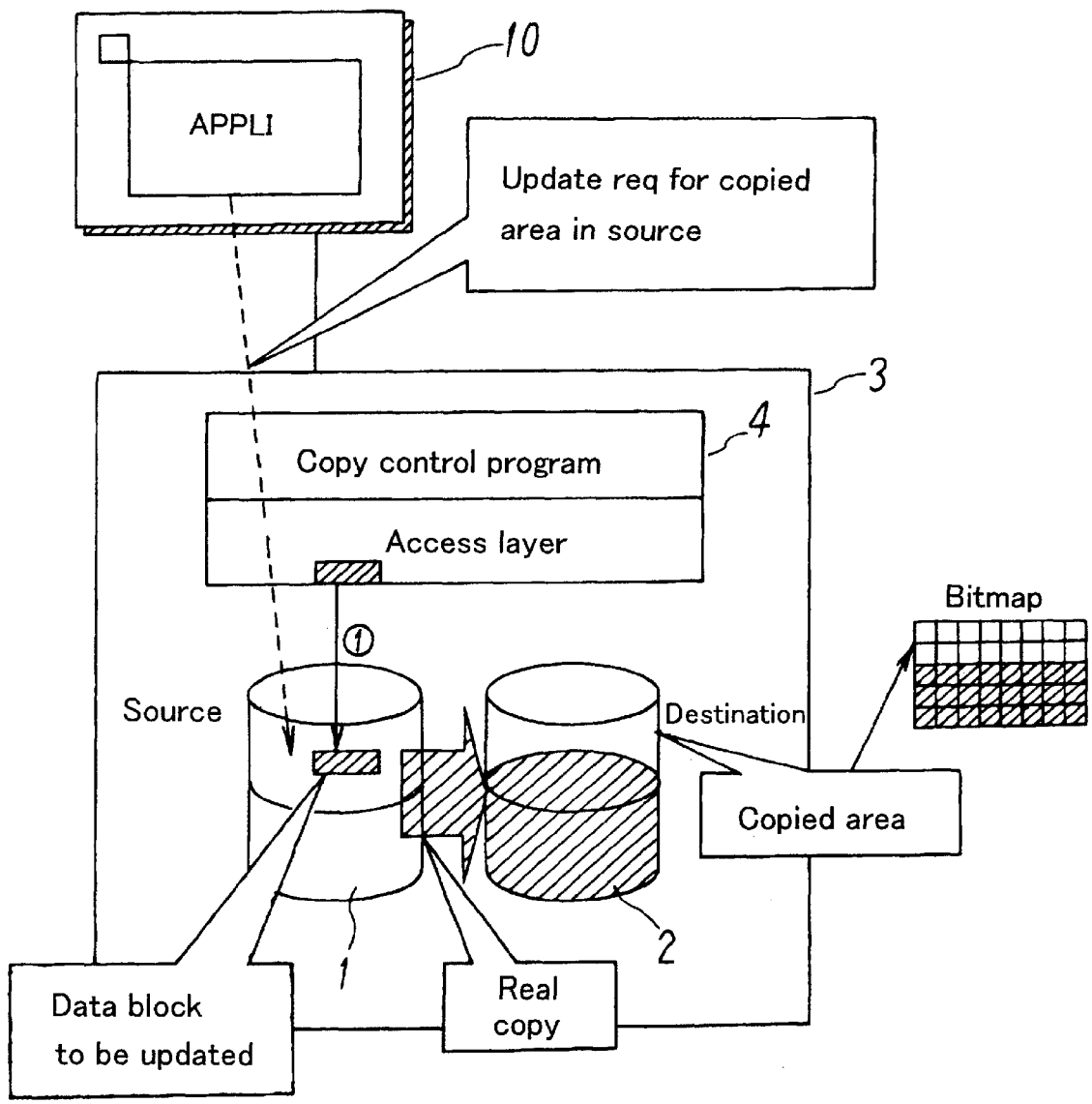
FIG. 8 is a drawing explaining the update operation of a copied portion of the copy source of one embodiment of this invention.
Figure 9:
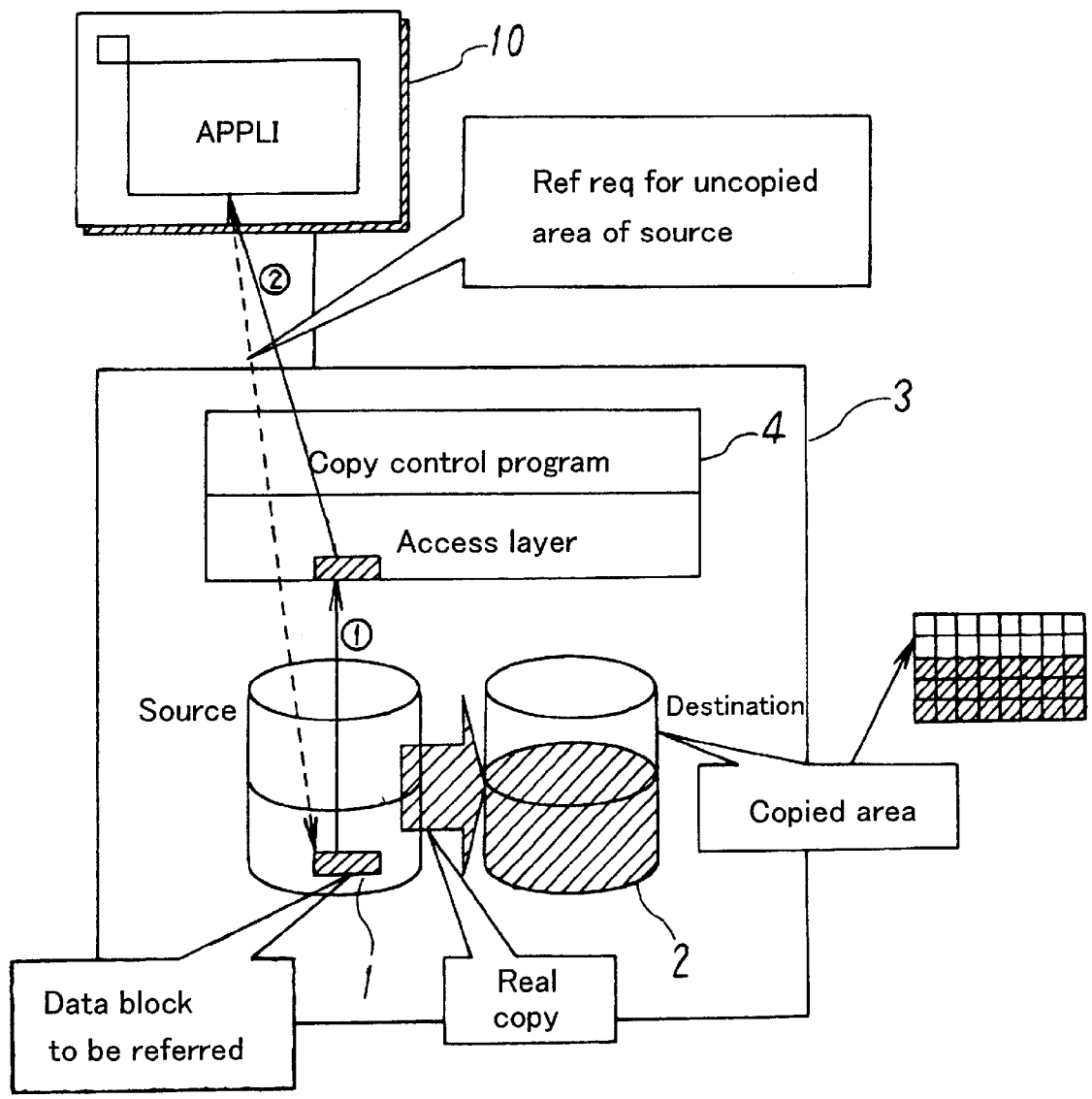
FIG. 9 is a drawing explaining the reference operation of an uncopied portion of the copy source of one embodiment of this invention.
Figure 10:
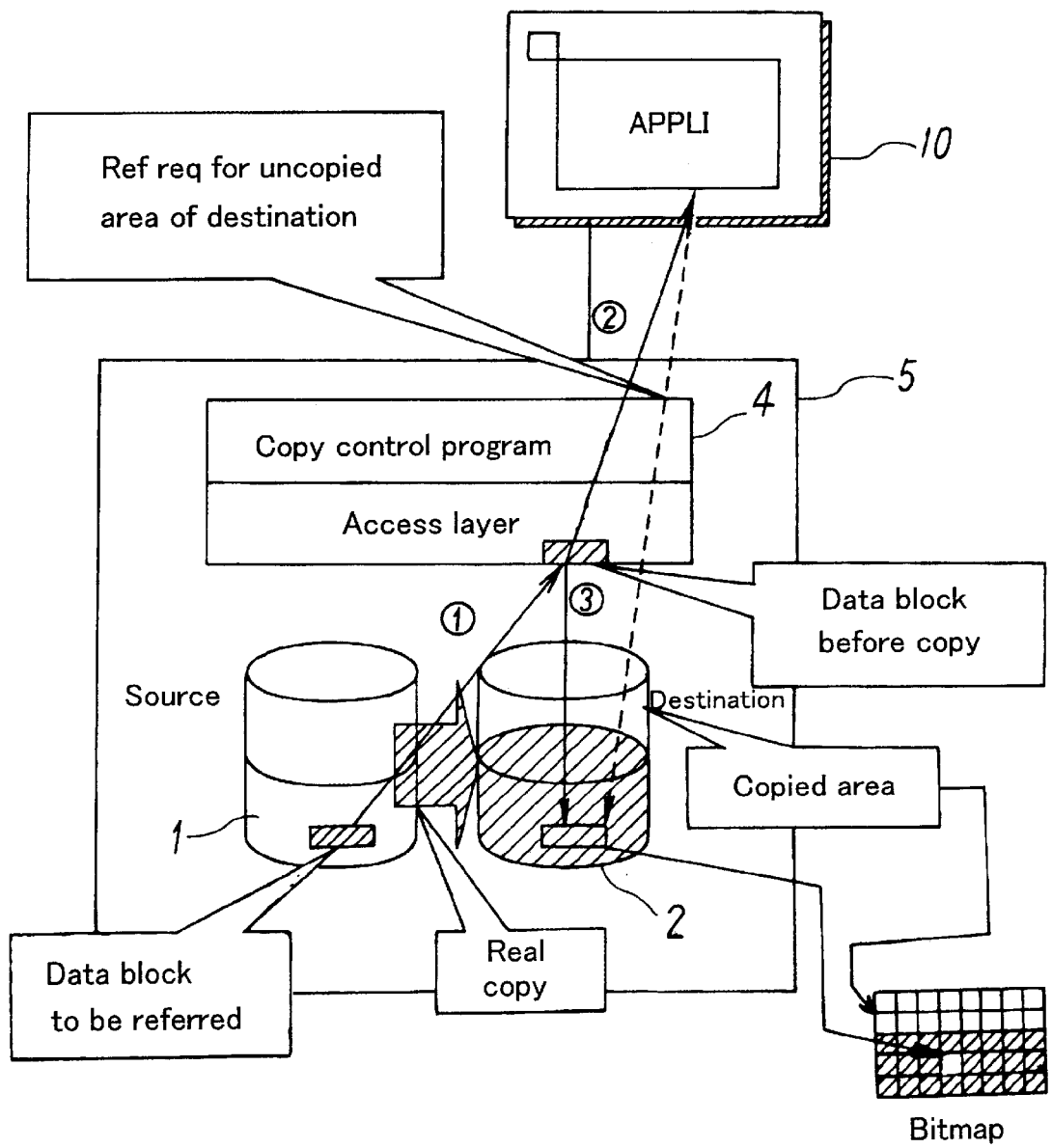
FIG. 10 is a drawing explaining the update operation of an uncopied portion of the copy destination of one embodiment of this invention.
Figure 11:
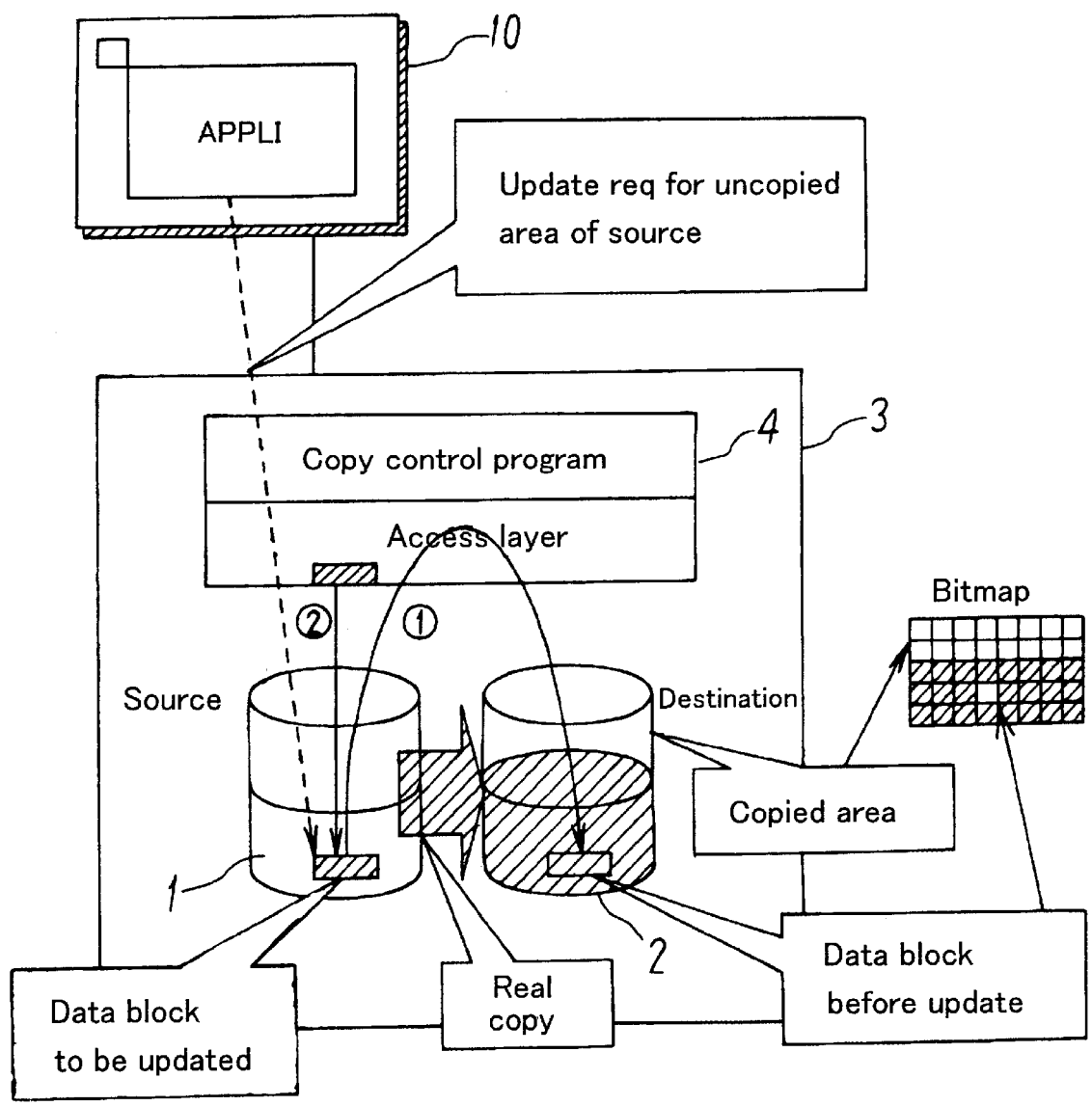
FIG. 11 is a drawing explaining the update operation of an uncopied portion of the copy source of one embodiment of this invention.
Figure 12:
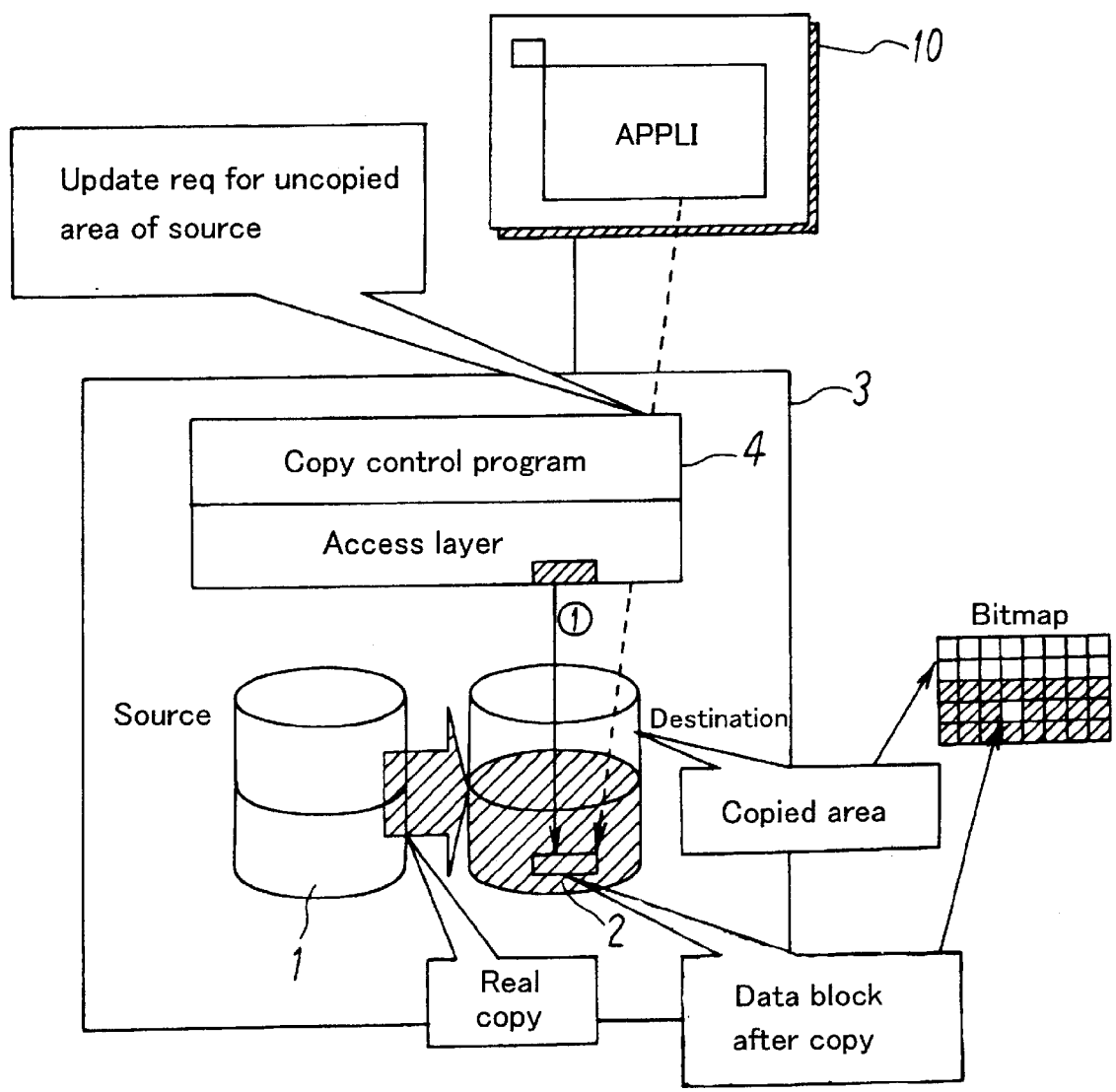
FIG. 12 is a drawing explaining the update operation of an uncopied portion of the copy destination of one embodiment of this invention.
Figure 13:
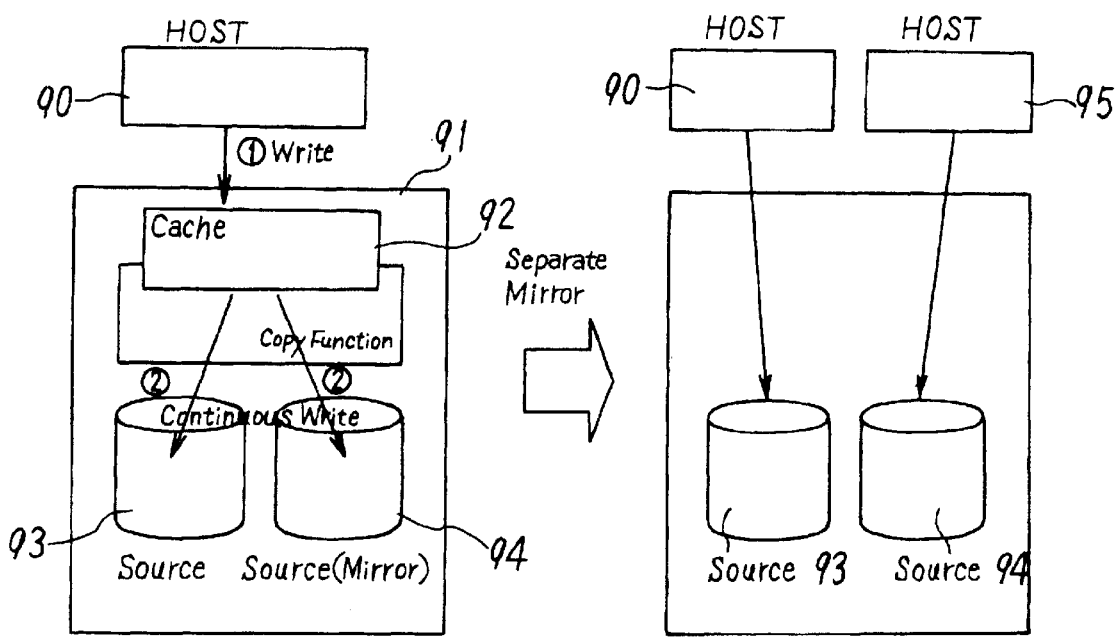
FIG. 13 is diagram showing the prior separate dual volume system.
Figure 14:
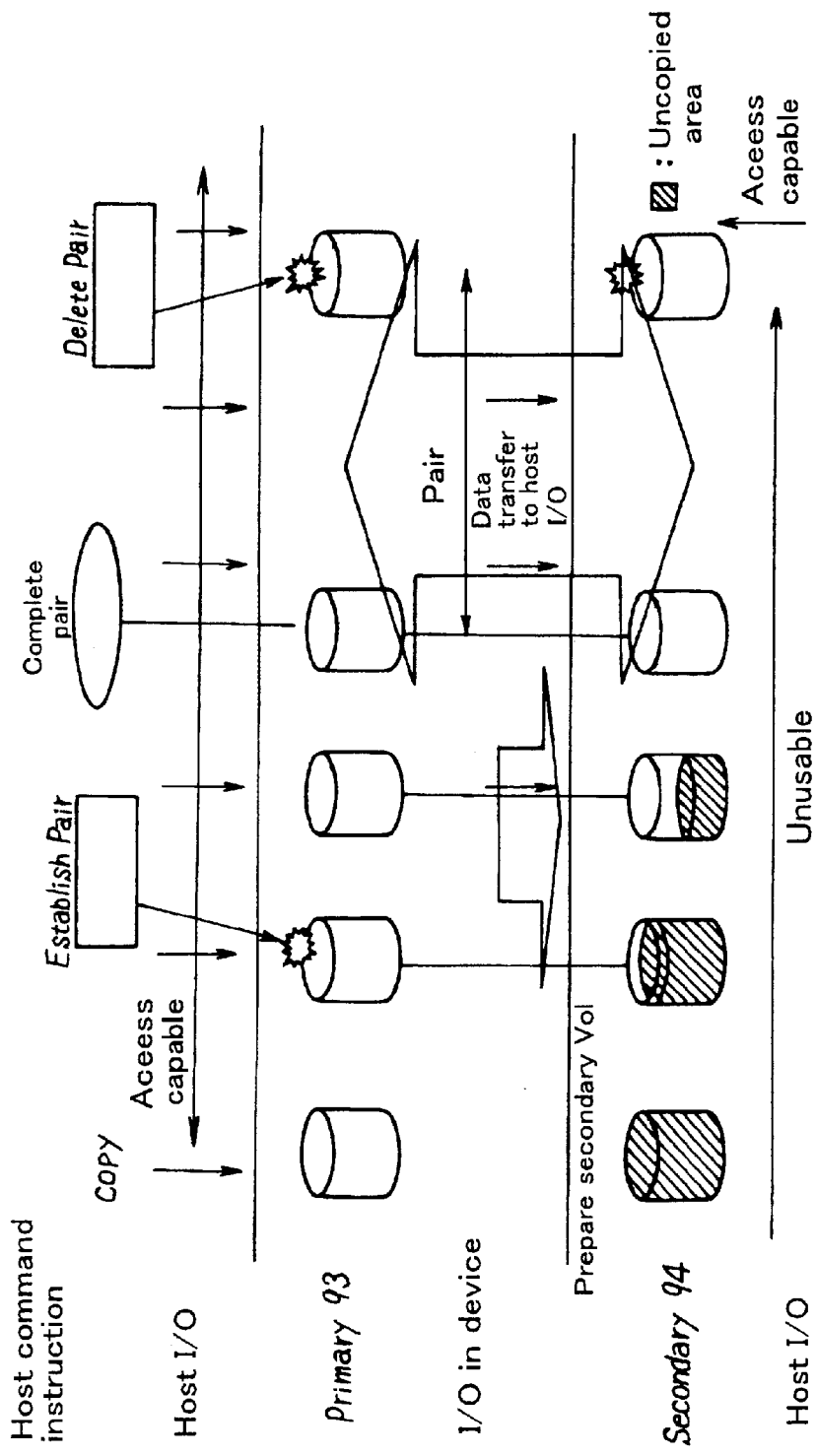
FIG. 14 is a drawing explaining the operation of the prior separate dual volume system.
Figure 15:
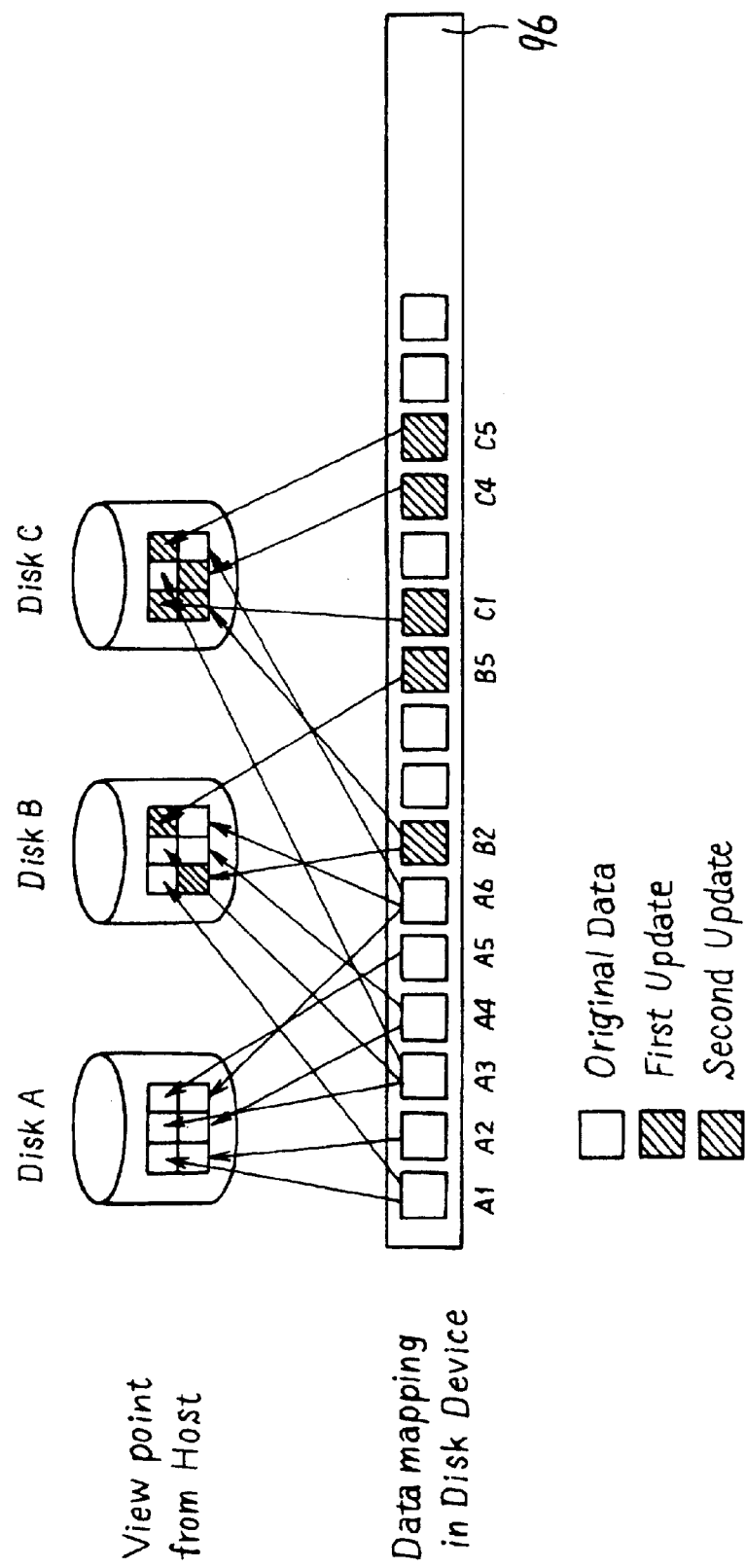
FIG. 15 is a drawing explaining the prior log structured system.
Figure 16:
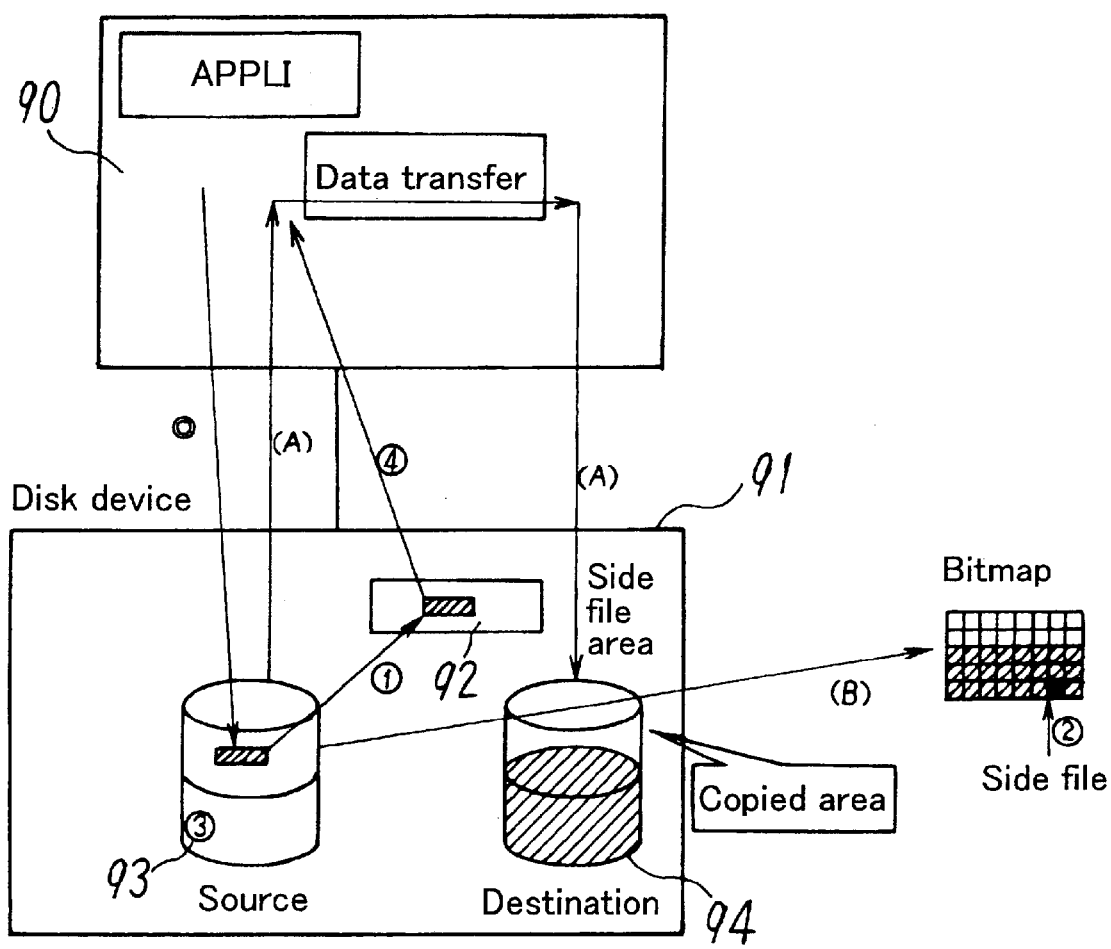
FIG. 16 is a drawing explaining the prior concurrent copy system.

FIG. 4 is a flowchart of the process for referencing the logical disks during copying. FIG. 5 is a flowchart of the process for updating the logical disks during copying. FIG. 6 explains the access pattern for accessing the logical disks during copying, while FIG. 7 to FIG. 12 explain that operation. FIG. 7 is a drawing explaining the reference operation of a copied portion of the copy source. FIG. 8 is a drawing explaining the update operation of a copied portion of the copy source. FIG. 9 is a drawing explaining the reference operation of an uncopied portion of the copy source. FIG. 10 is a drawing explaining the update operation of an uncopied portion of the copy destination. FIG. 11 is a drawing explaining the update operation of an uncopied portion of the copy source. FIG. 12 is a drawing explaining the update operation of an uncopied portion of the copy destination.

FIG. 4 will be used to explain the reference process during copying.

(S10) When the processor 4 detects a reference instruction (read), it determines whether actual copying is in progress. When actual copying is not in progress, the process advances to the normal reference process of step S15.

(S11) When actual copying is in progress, the processor 4 determines whether the reference instruction is a reference request for the copy source. When the reference instruction is a reference request for the copy source (access pattern 1, 3 in FIG. 6), the process advances to the normal reference process of step S15.

(S12) When the reference instruction is not the reference request for the copy source, the request is a reference request for the copy destination. The processor 4 references the bitmap 8 and determines whether or not the requested reference area is an uncopied portion. When the request is not a reference request for an uncopied portion of the copy destination, or in other words, when the request is a reference request for a copied portion of the copy destination (access pattern 5 in FIG. 6), the process advances to the normal reference process of step S15.

(S13) As shown in FIG. 10, when the request is a reference request for an uncopied portion of the copy destination (access pattern 7 in FIG. 6), the processor 4 instructs that the target blocks be read from the copy-source logical disk 1, and performs staging of the target data blocks of the copy-source logical disk in the copy-source cache memory 7. Next, it copies the uncopied data blocks, that were read into the copy-source cache memory 7, to the copy-destination cache memory 9. The uncopied data blocks in the cache memory 9 are transferred to the host (application) 10. The processor 4 then instructs that the uncopied data blocks that were copied into the cache memory 9 be written to the copy-destination logical disk 2, and then the uncopied data blocks that were copied into the cache memory 9 are written to the logical disk 2. The processor 4 sets the update block information for the copy-source bitmap 6 and copy-destination bitmap 8 to "0", indicating that update has been completed.

(S14) The processor 4 determines whether there are any data blocks of the referenced blocks still remaining. When there still are some data blocks of the referenced blocks remaining, the process returns to step S13. When there are no data blocks of the referenced blocks remaining, the reference process ends.

(S15) In normal reference processing, the processor 4 reads the specified reference blocks from the logical disk 1 or 2, and transfers them to the host. Then processing ends.

Moreover, the reference operation of copied portions of the copy source (access pattern 1 in FIG. 6) is as shown in FIG. 7. Also, the reference operation of uncopied portions of the copy source (access patter 3 in FIG. 6) is as shown in FIG. 9. Furthermore, the reference operation of copied portions of the copy destination (access pattern 5 in FIG. 6) is the same as that shown in FIG. 7.

Next, the update process during copying will be explained with reference to FIG. 5.

(S20) When the processor 4 detects an update instruction (write), it then determines whether actual copying is in progress. When actual processing is not in progress, the process advances to the normal update processing of step S28.

(S21) When actual copying is in progress, then the processor 4 determines whether there is an update request for the copy source.

(S22) When there is an update request for the copy source, the processor 4 references the bitmap 6 and determines whether or not the requested update area is an uncopied portion. When the request is not an update request for uncopied portions of the copy source, or in other words, when the request is an update request for copied portions of the copy source (access pattern 2 in FIG. 6) the process advances to the normal update processing of step S28.

(S23) As shown in FIG. 11, when the request is an update request for uncopied portions of the copy source (access pattern 4 in FIG. 6), then the processor 4 instructs that the target update blocks be read from the copy-source logical disk 1, and performs staging of the target update data blocks from the copy-source logical disk 1 in the copy-source cache memory 7. Next, it copies the target update data blocks, that were read into the copy-source cache memory 7, to the copy-destination memory 9. The processor 4 instructs that the target update data blocks that were copied into the cache memory 9 be written to the copy-destination logical disk 2. The target update data blocks that were copied into the cache memory 9 are then written to the logical disk 2. The processor 4 sets the update block information of the copy-source bitmap 6 and the copy-destination bitmap 8 to "0", indicating that update was completed. In addition, the processor 4 writes the update data blocks, that were transferred to the cache memory 7 from the host, to the logical disk 1.

(S24) The processor 4 determines whether there are any data blocks of the update data still remaining. When there are data blocks of update data still remaining, the process returns to step S23. When there are no data blocks of update data remaining, the update process ends.

(S25) When the request in step S21 is not an update request for the copy source, then it is an update request for the copy destination. The processor 4 references the bitmap 8 and determines whether or not the requested update area is an uncopied portion. When the request is not an update request for uncopied portions of the copy destination, or in other words, when the request is an update request for copied portions of the copy destination (access pattern 6 in FIG. 6), then the process advances to the normal update processing of step S28.

(S26) When the request is an update request for uncopied portions of the copy destination (access pattern 8 in FIG. 6), then, as shown in FIG. 12, the processor 4 instructs that the update data blocks, that are stored in the cache memory 9, be written. The update data blocks that are stored in the cache memory 9 are then written to the logical disk 2. The processor 4 sets the update block information of the copy-source bitmap 6 and the copy-destination bitmap 8 to "0", indicating that update has been completed. By doing this, copying of this area by the copy operation is prohibited.

(S27) The processor 4 determines whether there are data blocks of update data still remaining. When there are data blocks of update data remaining, the process returns to step S26. When there are no data blocks of update data, the update process ends.

(S28) In normal update processing, the processor writes the update data blocks, that were transferred to the cache memory 7 or 9 from the host, to the specified logical disk 1 or 2. The update process then ends.

The update operation of copied portions of the copy source (access pattern 2 in FIG. 6) is as shown in FIG. 8. Also, the update operation of copied portions of the copy destination (access pattern 6 in FIG. 6) is the same as shown in FIG. 8.

In summarizing the operations described above, there are a total of eight access pattern from the host during copying as shown in FIG. 6. In referencing of copied portions of the copy-source or copy-destination logical disks 1, 2 (access patterns 1, 5), data blocks of reference data from the specified logical disk 1 or 2 are staged in the cache memory 7, 9, and then the host is notified of the staged data blocks (see FIG. 7). This processing is influenced by the copied/uncopied status of the data blocks, and is identical to normal reference processing.

In updating copied portions of the copy-source or copy-destination logical disk 1, 2 (access patterns 2, 6), data blocks are updated in the cache memory 7, 9 specified from the host are written in the copy-source or copy-destination logical disk 1, 2 (see FIG. 8). In this process, the data blocks are copied, so the process is the same as normal update processing.

In referencing uncopied portions of the copy-source logical disk (access pattern 3), the data blocks of reference data are staged in the cache memory 7 from the copy-source logical disk 1, and then the host is notified of the staged data blocks (see FIG. 9). This process is influenced by the copied/uncopied status of the data blocks, so is identical to normal reference processing.

In this process, copying can also be performed by writing the staged data blocks to the copy-destination logical disk 2. When doing this, it is also possible to perform only the referencing described above, and to perform copying later.

Figure 3D:
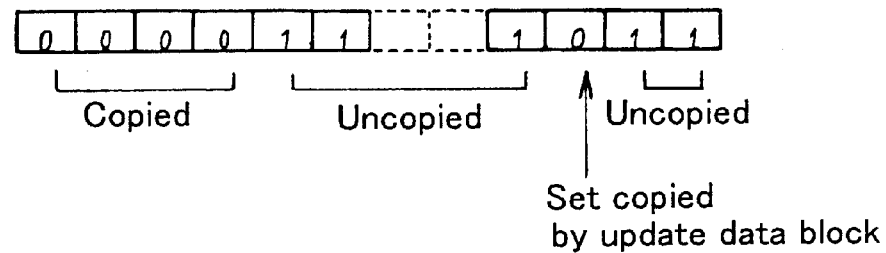

In updating uncopied portions of the copy-source logical disk 1 (access pattern 4), the target update data blocks of the copy-source logical disk 1 are written (copied) to the copy-destination logical disk 2. When doing this, as shown in FIG. 3D, the update bits of the bitmaps 6, 8, that control the copy state, are updated to the copied state, and copying of this data block area is set as being completed. Then, the update data blocks from the host are written to the copy-source logical disk 1 (see FIG. 11).

In referencing uncopied portions of the copy-destination logical disk 2 (access pattern 7), the target reference data blocks from the copy-source logical disk 1 are staged in the cache memory 9, then the host is notified of the staged data blocks. Also, the staged data blocks are written to the copy-destination logical disk 2 (see FIG. 10). As shown in FIG. 3D, when doing this, the update bits for the data blocks of the bitmaps 6, 8, that control the copy state, are updated to the copied state, and copying of this data block area is set as being completed.

In updating uncopied portions of the copy-destination logical disk 2 (access pattern 8), the update data blocks from the host are written to the copy-destination logical disk 2 (see FIG. 12). As shown in FIG. 3D, at that time, the update bits of the bitmaps 6, 8, that control the copying state, are updated to the copied state, and copying of this data block area is set as being completed. Therefore, copying from the copy source of that data block area to the copy destination is prohibited.

In this way, copying is performed by divided up the copy range into a plurality of areas, and copying in units of these area divisions. Therefore it is possible to receive an I/O request from the host and process that I/O request during the copying process. In addition, it is possible to immediately access a logical disk even when a copy instruction is received.

Moreover, when performing update access of an uncopied area of the copy-source logical disk, the uncopied area of the copy-source logical disk is updated after it is copied to the copy-destination logical disk. Therefore, it is possible to prevent the copy data of the copy-destination logical disk from becoming the updated data due to the update access.

Furthermore, when performing reference access of an uncopied area of the copy-destination logical disk, the data of the corresponding area of the copy-source logical disk is read and transferred. Therefore, it is possible to provide copy data even when performing reference access of an uncopied area of the copy-destination logical disk. Also, it is possible to add the process of copying the data of the area read from the copy-source logical disk to the copy-destination logical disk, as in this embodiment. By doing this, it is possible to use the read data in the copying process.

Furthermore, when performing update access of an uncopied area of the copy-destination logical disk, the data of the corresponding area of the copy-destination logical disk is updated with update data, and since copying to that area is prohibited, it is possible to prevent the update data from being changed by copy data.

Also, since control information is used for controlling the copy state of each area by way of a bitmap or the like, it is easy to determine whether the area is a copied area or uncopied area. Moreover, it is possible to prevent recopying during access processing even when the access area is copied before copying another area. Similarly, it is possible to prevent replacing update data with copy data even when updating the copy-destination logical disk.

The control information is a bitmap so it is possible to control copying with a small amount. There are separate bitmaps 6, 8 for each logical disk, however it is also possible to use one common bitmap for each logical disk.

Moreover, it is possible to use conventional access technology of using a cache memory when accessing or copying the logical disks 1, 2. In other words, in a system where part of the data of the physical disk is staged in a cache memory, the logical disk is accessed by first accessing the cache memory and finding the appropriate block data. When the appropriate block data are not staged in the cache memory, the block data are obtained by accessing the physical disk. The same is true when performing an update. The data in the cache memory are updated. This kind of conventional cache memory can be used. In this case, the logical disks 1, 2 comprise a physical disk and cache memory.

Besides the embodiment described above, the invention can be changed as follows.

(1) In the embodiment described above, the processor 4 of the disk controller 3 executes the copying process, however it is also possible for the host of a server or the like to execute the copying process. Also, it is possible to do away with the disk controller 3 by having the host of a server or the like execute the copying and access processes.

(2) During reference access of an uncopied area of the copy-destination logical disk, the copy-source logical disk is referenced and copied to the copy-destination logical disk, however it is also possible reference the copy-source logical disk and copy to the copy-destination logical disk separately.

The preferred embodiment of the present invention has been explained, however the invention is not limited to this embodiment and can be embodied in various forms within the scope of the present invention.

In another form of this invention, the access step further comprises a step of referencing the target access area of the copy-source logical disk when performing reference access of the copy-source logical disk, and a step of referencing or updating the target access area of the copy-destination logical disk when accessing copied areas of the copy-destination logical disk.

In another form of this invention, the step of referencing an uncopied area of the copy-destination logical disk comprises a step of copying the target access area of the referenced copy-source logical disk to the copy-destination logical disk after the target access area of the copy-source logical disk has been referenced. By doing this, it becomes possible to copy together with referencing.

In another form of the invention, the access step further comprises a step of updating the control information of the target access area after the target access area of the copy-source logical disk has been copied to the copy-destination logical disk.

In this way, it is possible for the control information to accurately indicate the copying condition through access processing even if copying is performed in advance.

In another form of the invention, the copying step comprises a step of referencing the control information that indicates the copying condition of each of the areas of the copy-source logical disk and setting the next copy area, a step of reading the target area of the copy-source logical disk in memory, a step of updating the control information after the target area has been read, and a step of writing the target area of the memory to the copy-destination logical disk.

By reading the target area in memory, it becomes possible to access the copy-source logical disk by updating the control information.

In another form of the invention, the copying step comprises a step of referencing a bitmap indicated by a flag that indicates the copying condition of each area and setting the next copy area, and a step of updating the copy area flag of the bitmap.

Since the control information is expressed as a bitmap, it is possible to reduce the amount of memory occupied by the control information.

In another form of the invention, the copying step further comprises a step of notifying in when copying is finished according to the copy instruction. By doing this, it is possible to immediately know when the access source can be accessed.

As explained above, the present invention has the following effects.

(1) The copy-source logical disk is divided up into a plurality of areas, and copying to the copy-destination logical disk is performed in units of area divisions. When there is an access request while copying is in progress, the copying operation is interrupted and the access operation is performed. Therefore, it is possible to receive the access request and perform reference access or update access of the copy-source and copy-destination logical disks while actual data is being copied.

(2) Also, when performing update access of an uncopied area of the copy-source logical disk, the target access area of the copy-source logical disk is updated after the target access area of the copy-source logical disk is copied to the copy-destination logical disk. Therefore, it is possible to copy the data before the update when there is a copy instruction.

(3) When performing reference access of an uncopied area of the copy-destination logical disk, the data of the corresponding area of the copy-source logical disk is read. Therefore, it is possible to reference copy data of-that area even when the area is an uncopied area of the copy-destination logical disk.

(4) When performing update access of an uncopied area of the copy-destination logical disk, copying that area is prohibited after the copy-destination logical disk has been updated with the update data. Therefore, it is possible to prevent changes to the update data of that area of the copy-destination logical disk due to copying.

What is claimed is:

1. An accessing method of logical disks comprising:
   first accessing a cache memory to store part of data of the logical disks that is staged from the logical disks according to an access request from a host;
   second accessing a designated logical disk when not finding a target data in the cache memory by said first accessing and staging said target data from said designated logical disk to said cache memory in response to said access request from said host; and copying data from a copy-source logical disk to a copy-destination logical disk according to a copy instructions from the host;

wherein the copying comprising:

performing said staging to stage data of a copy target area of the copy-source logical disk to a first cache memory to store part of data of the copy-source logical disk;

transferring the staged data in the first cache memory to a second cache memory to store part of data of the copy-destination logical disk;

writing the transferred data in the second cache memory to the copy-destination logical disk, referencing control information that indicates a copying condition of the each of the areas of the copy-source logical disk in a first bitmap and determining a next copy area according to the reference result, updating the control information in the first bitmap and a second bitmap that indicates a copying condition of the each of the areas of the copy-destination disk, interrupting said copying in response to the access request from the host; and allowing accesses to the copy-source logical disk by referring the first bitmap when said access request is a request for the copy-source logical disk and to the copy-destination logical disk by referring the second bitmap when said request for the copy-destination logical disk during said copying.

2. The accessing method of claim 1, wherein said allowing of access includes:

referencing the first bitmap, copying the target access area of the copy-source logical disk to the copy-destination logical disk and then updating the target access area of the copy-source logical disk when the access request is a request for updating an uncopied area of the copy-source logical disk;

referencing the second bitmap, staging the target access area of the copy-source logical disk to the first cache memory and transferring the staged data from the first cache memory to the second cache memory when the access request is a request for referencing an uncopied area of the copy-destination logical disk; and referencing the second bitmap, writing the update data to the second cache memory, updating the target access area of the copy-destination logical disk and prohibiting copying of data from the copy-source logical disk to the target area when the access request is for the updating of an uncopied area of said copy-destination logical disk.

3. A disk storage system comprising:

at least one physical disk including a plurality of logical disks;

a cache memory to store part of data of the logical disks that is staged from the logical disks; and a disk controller to search the cache memory whether a target data is stored or not in the cache memory and to access a designated logical disk and stage said target data from said designated logical disk to said cache memory in response to said access request from a host when not finding a target data in the cache memory by said search according to an access request from said host, wherein the cache memory comprises a first cache memory to store part of data of the copy-source logical disk and a second cache memory to store part of data of the copy-destination logical disk, and wherein the disk controller performs said staging to stage data of a copy target area of the copy-source logical disk to the first cache memory to store part of data of the copy-source logical disk, transfers the staged data in the first cache memory to the second cache memory to store part of data of the copy-destination logical disk, and writes the transferred data in the second cache memory to the copy-destination logical disk, a first bit map that stores control information that indicates a copying condition of the each of the areas of the copy-source logical disk and a second bit map that stores control information that indicates a copying condition of the each of the areas of the copy-destination logical disk, and wherein the disk controller references the control information that indicates a copying condition of the each of the areas of the copy-source logical disk in a first bitmap and determines a next copy area according to the reference result and updates the control information in the first bitmap and the second bitmap that indicates a copying condition of the each of the areas of the copy-destination disk, and wherein further the disk controller interrupts said copying in response to the access request from the host, and allows accesses to the copy-source logical disk by referring the first bitmap when said access request is a request for the copy-source logical disk and to the copy-destination logical disk by referring the second bitmap when said request for the copy-destination logical disk during said copying.

4. The disk storage system of claim 3, and wherein the disk controller references the first bitmap, copies the target access area of the copy-source logical disk to the copy-destination logical disk and then updates the target access area of the copy-source logical disk when the access request is a request for updating an uncopied area of the copy-source logical disk;

references the second bitmap, staging the target access area of the copy-source logical disk to the first cache memory and transfers the staged data from the first cache memory to the second cache memory when the access request is a request for referencing an uncopied area of the copy-destination logical disk; and references the second bitmap, writing the update data to the second cache memory, updates the target access area of the copy-destination logical disk and prohibits copying of data from the copy-source logical disk to the target area when the access request is for the updating of an uncopied area of said copy-destination logical disk.

* * * * *